July 30, 1957 — H. H. GILMAN ET AL — 2,800,974
SPRAY COOLING APPARATUS AND METHOD
Filed Nov. 29, 1954 — 6 Sheets-Sheet 1

INVENTORS
HARRIS H. GILMAN
LELAND L. HENNING
ERNEST T. MOCK
WILLIAM R. POSTLEWAITE
BY
ATTORNEYS

INVENTORS
HARRIS H. GILMAN
LELAND L. HENNING
ERNEST T. MOCK
WILLIAM R. POSTLEWAITE

BY

ATTORNEYS

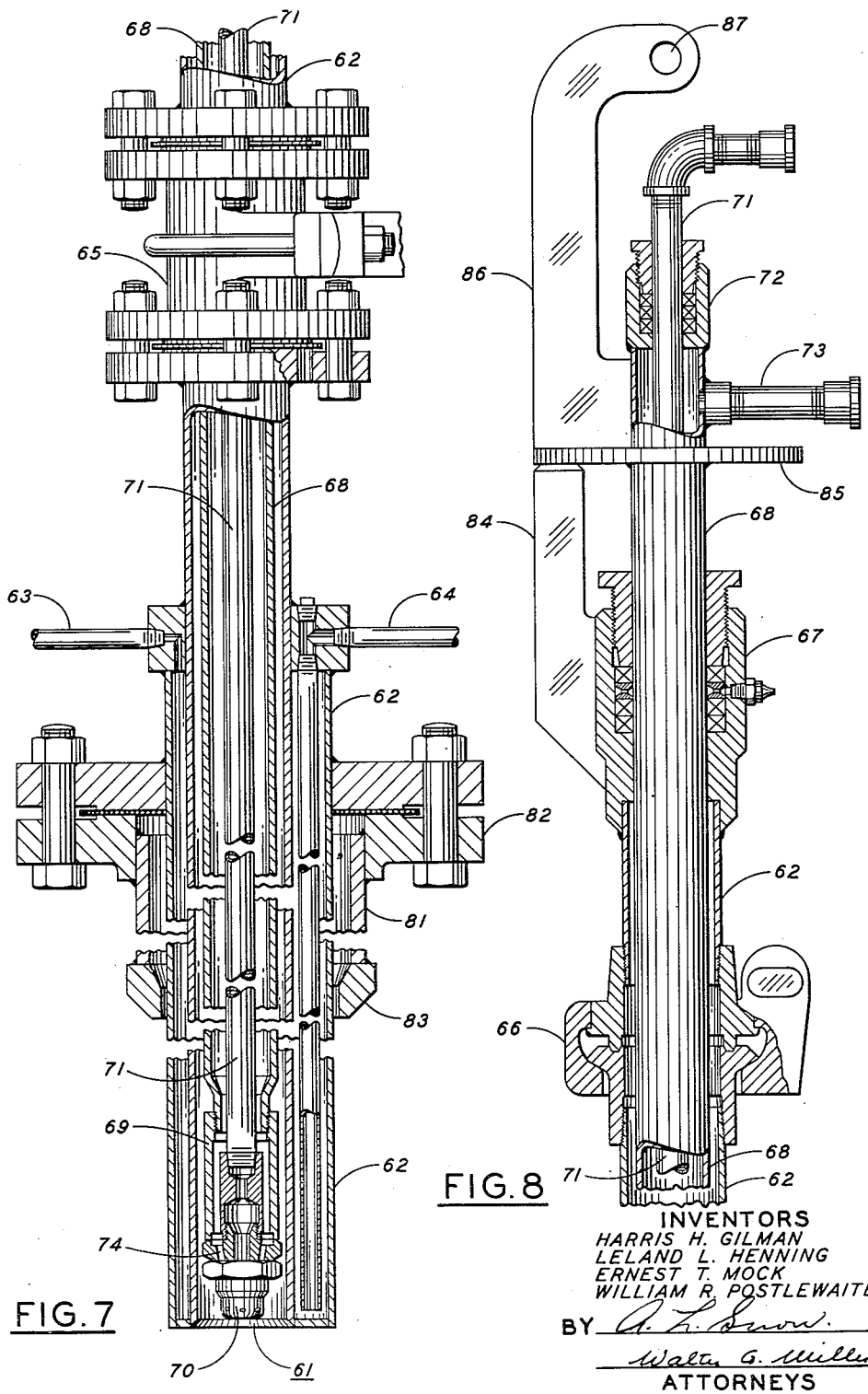

United States Patent Office 2,800,974
Patented July 30, 1957

2,800,974

SPRAY COOLING APPARATUS AND METHOD

Harris H. Gilman, Palo Alto, Leland L. Henning, Bakersfield, Ernest T. Mock, Corte Madera, and William R. Postlewaite, Menlo Park, Calif., assignors, by mesne assignments, to California Research Corporation, San Francisco, Calif., a corporation of Delaware Application November 29, 1954, Serial No. 471,602

11 Claims. (Cl. 183—2)

This invention relates to an improved system for rapidly and controllably withdrawing heat from a moving stream of hot gas and particularly refers to methods and means for quenching a stream of a mixture of reacted hydrocarbon vapors to condense a desired solid component therefrom by a plurality of water sprays, together with methods and means for handling the solid and vapor components during their passage through and out of the system.

In the manufacture of phthalic anhydride by the controlled oxidation of hydrocarbons such as orthoxylene, the difficulty of rapid and economical cooling of the reaction mixture has presented problems of heat removal and also of handling the resultant solid products. Heretofore, the phthalic anhydride has been crystallized out as solid needle-like crystals by long-time exposure to atmospheric temperature in large box-like structures designated "hay-barns." Attempts to water-quench the reactant gases to condense and remove the product have generally involved a two-step operation, in which the water spray in a cooling tower is utilized to form a flake-like aggregate which is subsequently melted at the bottom of the tower at a temperature of about 155° C. (311° F.) and removed in liquid form to a storage tank (U. S. Patent 2,448,868, Davis). Another method has been that of the U. S. Patent 2,071,329 to Brown, in which the hot reaction products are brought into direct contact with excessive amounts of water so that the phthalic anhydride is hydrated to phthalic acid, and a solution or slurry is formed from which the phthalic anhydride must be separated.

This invention comprehends broadly an improved system and apparatus for receiving the reaction mix, controllably contacting it with water sprays in a preferred environment, separating the condensed solid product, removing it in solid form from the cooling zone, and controlling withdrawal of the uncondensed vaporized product, water vapor, and the like, to give a desirable solid phthalic anhydride product and to prevent undesired accumulations thereof throughout the system.

It is an object of this invention to provide an improved spray quench method and apparatus for rapidly removing both heat and solid product from a stream of reacted hydrocarbons, and more specifically, ortho-xylene which has been controllably oxidized to phthalic anhydride.

Another object is to provide an improved condensing or cooling vessel with a plurality of water spray nozzles that are removable for cleaning or adjustment without interfering with the continuous operation of the unit.

Another object is to provide an improved wall and passage scraping mechanism for a system of this kind that will operate continuously for long periods of time without shutdowns.

Another object is to provide an improved construction for a condensing or cooling vessel of this kind which is readily separable in a median plane for inspection or maintenance, and in which the wall scraping mechanism is entirely supported from the upper, or removable, portion.

Another object is to provide an improved construction for a condensing or cooling vessel in which the principal support comprises a medial flange so that the upper and lower portions are free to move under thermal cycling conditions of operation whithout throwing other parts of the system out of alignment.

These and other objects and advantages will be further apparent from the following description and the attached drawings, which form a part of this specification and illustrate a preferred embodiment of the invention.

In the drawings:

Fig. 7 is a vertical sectional detail view of the lower end of a preferred form of a retractable water-spray nozzle as illustrated generally in Fig. 1.

Fig. 8 is a vertical section detail view of the upper end of the nozzle assembly shown in Fig. 7.

Figures 1, 2:
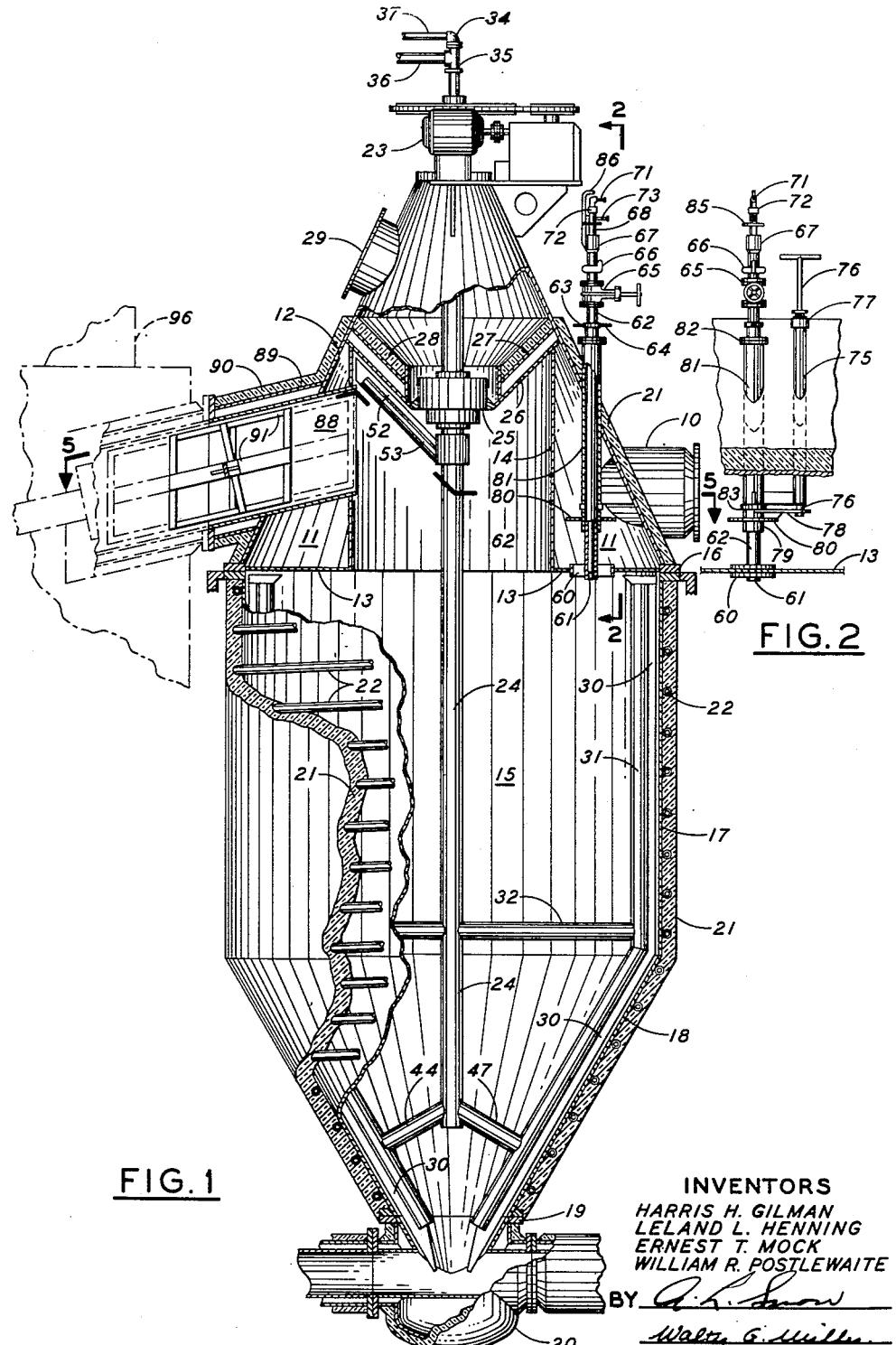
Fig. 1 is a vertical sectional view of an improved quench vessel embodying several novel features of this invention.
Fig. 2 is a vertical sectional view on line II—II of the structure of Fig. 1, illustrating the preferred arrangement of an externally controlled gas passage closing device.
Figure 3:
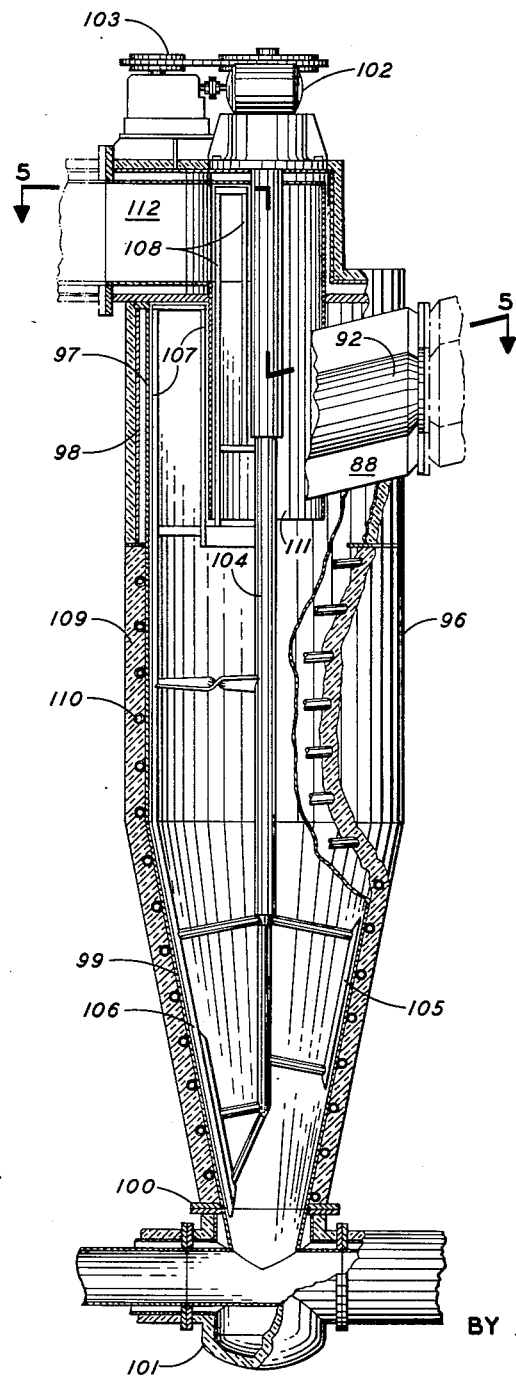
Fig. 3 is a vertical sectional view of a first cyclone separator adapted to receive suspended solids and uncondensed vapors from the outlet of the quench vessel of Fig. 1.
Figure 4:
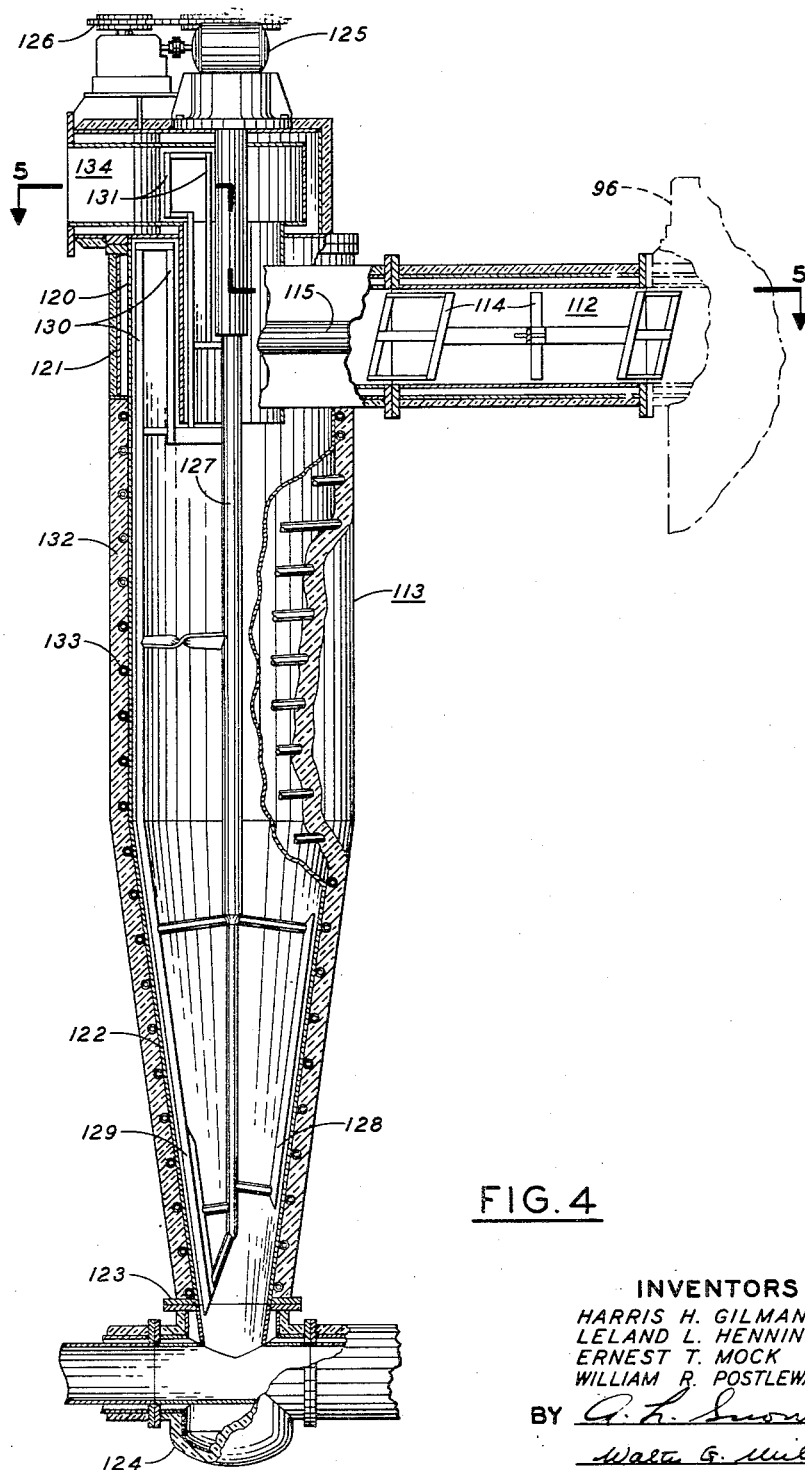
Fig. 4 is a vertical sectional view of a second cyclone separator adapted to receive suspended solids and uncondensed vapors from the outlet of the first cyclone of Fig. 2.
Figure 5:
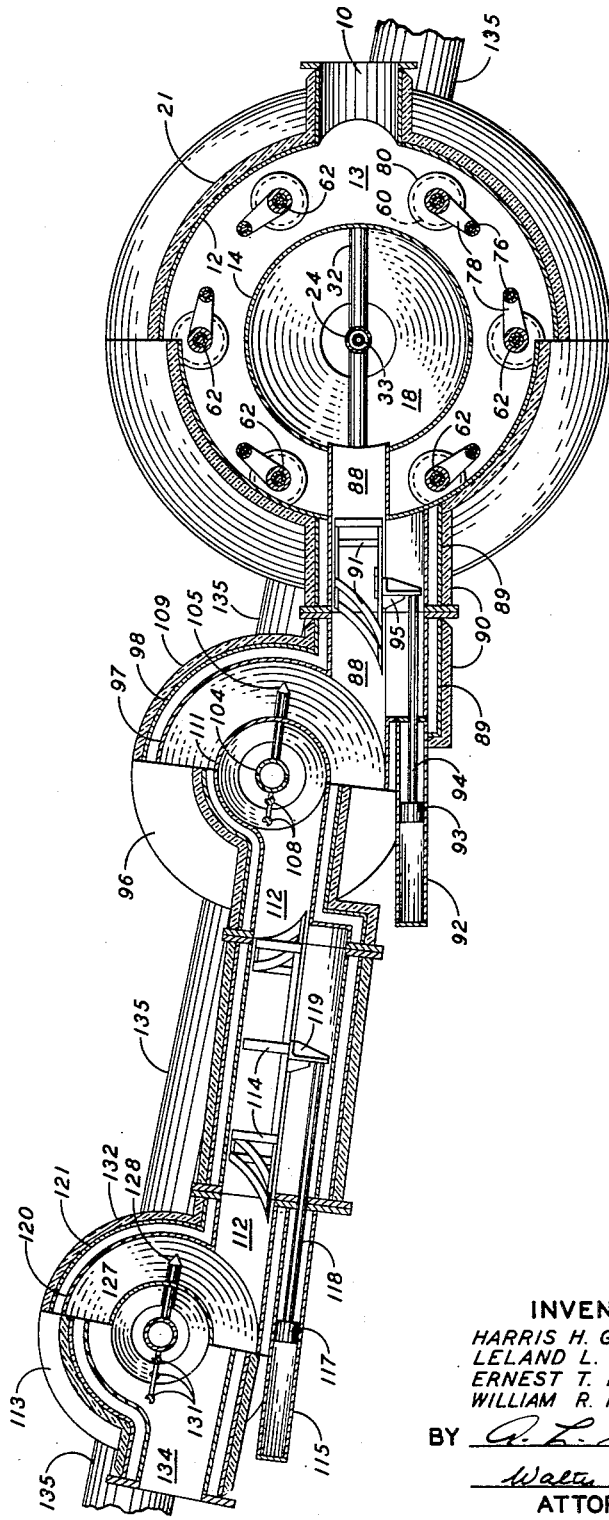
Fig. 5 is a horizontal sectional view on line V—V of Figs. 1, 3 and 4, illustrating the sequential disposition of the quench vessel and the first and second cyclone separators, respectively, of those figures.

Referring to the drawings and particularly to Figs. 1, 2 and 4, reference numeral 10 designates an inlet conduit adapted to receive reaction hydrocarbon vapors containing uncondensed phthalic anhydride at a temperature of about 300° F. from a reactor, which forms no part of this invention and hence is not shown, conduit 10 acting to convey those vapors into an annular plenum chamber 11 formed between the conical top 12, an annular plate 13, and a generally cylindrical outlet wall 14 for the cover of the quench vessel 15.

The quench vessel 15 is flanged to the cover or conical top 12 at 16 and desirably, but not necessarily, consists of a cylindrical body portion 17 and a steep conical bottom 18 flanged at 19 to a solids conveyor element 20, which will be described in greater detail below. Top 12, body 17, and bottom 18 are suitably insulated as at 21, and the body and bottom are surrounded by a heating element 22, in this case a coil or conduit through which steam or other hot fluid may be circulated to raise the shell of vessel 15 to the melting point of the phthalic anhydride (380° F.) to melt off solid deposits which may accumulate thereon. Desirably, the lower element of flanged connection 16 forms the support means for the vessel 15, as shown, to avoid misalignment of vapor connections, etc., due to temperature changes.

Top 12 extends upwardly to support a motor 23 and its associated speed-reducing means 24 and a hollow axially or centrally mounted scraper shaft 24 having a suitably cooled guide and thrust bearing 25 supported by a downwardly inclined head member 26. Desirably, head member 26 is provided with a steam jacket 27 and insulation 28. An access manhole 29 is provided in top 12 for installation and maintenance of the shaft 24 and bearing 25.

Sound practice generally requires that a quench vessel in this service should be provided with slowly moving scrapers for those parts on which solids may accumulate in normal or abnormal conditions of operation. In this example, the scraper blades 30 for the side 17 and bottom 18 of vessel 30 are supported by vertical hollow or tubular members 31 which are supported in turn by radial tubular members 32 from axial shaft 24.

Figure 6:
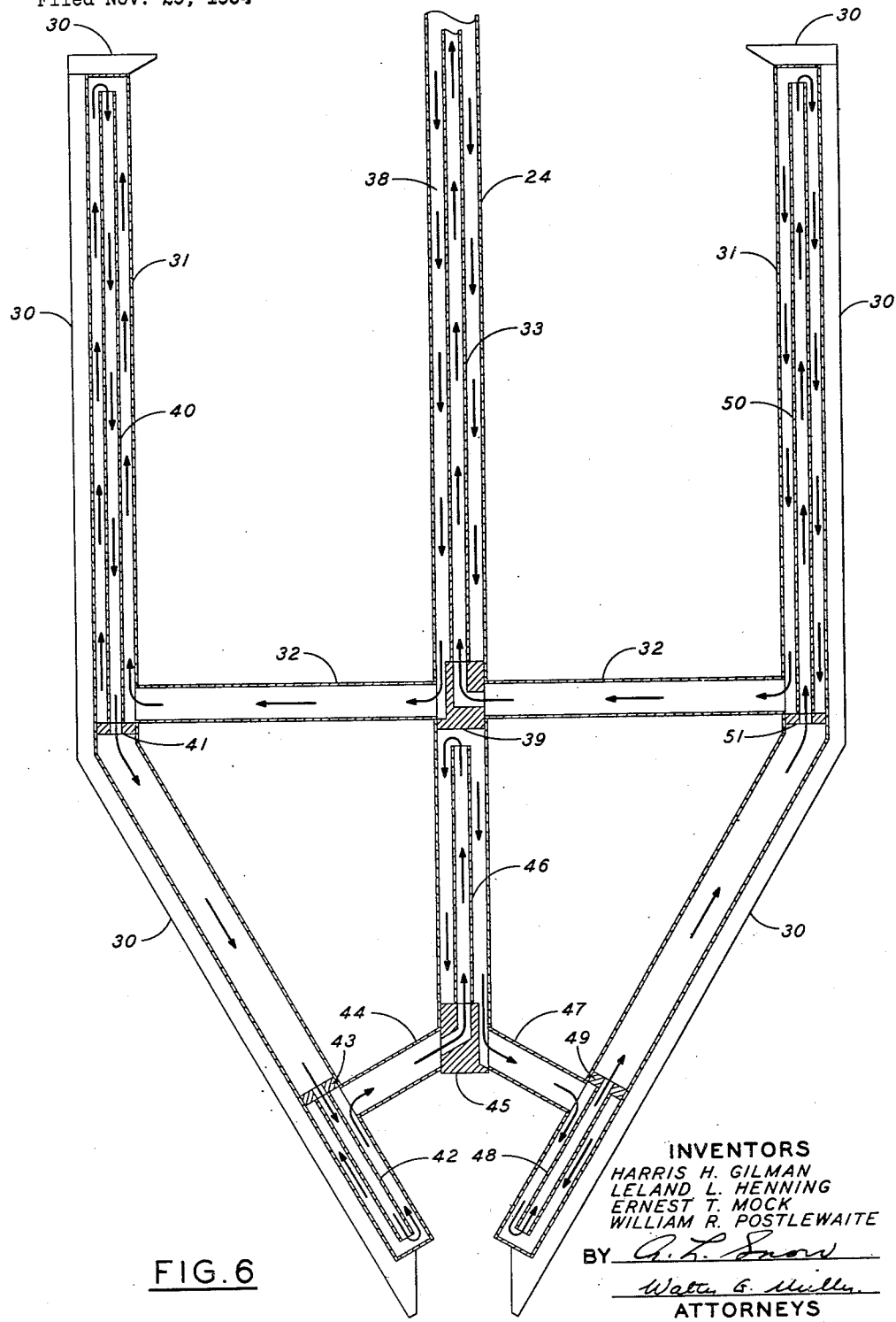
Fig. 6 is a vertical sectional detail view of a preferred embodiment of a fluid-heated scraper arrangement for the quench vessel of Fig. 1.

Referring now to Fig. 6, which shows one arrangement of heating fluid passages for shaft 24 and supports 31 and 32, it is noted that shaft 24 is provided with an inner conduit 33 extending throughout the shaft and out of the top thereof through appropriate packed connections 34 and 35 to connect to stationary inlet and outlet conduits 36 and 37. Inlet conduit 36 is supplied with steam or other suitable heating fluid 38 from any desired source (not shown). At the juncture of hollow shaft 24 with radial tubular member 32 (Fig. 6), a flow-directing block 39 directs the heating fluid from the annulus between conduit 33 and shaft 24, as shown by the arrows, into one tubular member 32 through which it flows into the left-hand vertical portion of the tubular support 31. That tubular support has an inner conduit 40, suitably sealed at 41, to direct the fluid throughout that support to the upper end thereof and then back down to the inclined portion of support 31 to a similar conduit 42 and seal 43 in the lowest or inclined portion of support 31. Inclined radial connection 44 conveys the heating fluid 38 to the lowest end of shaft 24, wherein a flow-directing block 45 and short inner conduit 46 insures that deposit-melting temperatures can be imposed on that portion of the hollow shaft. Thereafter, the fluid passes through the oppositely inclined radial connection 47 to the opposite (right-hand) vertical tubular support 31, wherein corresponding inner conduit 48 and seal 49 and inner conduit 50 and seal 51 in the vertical portion of the scraper support complete the circulation of the heating fluid 38 through the opposed scraper blade supports and back to conduit 33 in shaft 24, all as shown in Fig. 6.

The blades 30 extend radially from support members 31 and are desirably beveled at 60° to present a flat, sharp edge to any accumulation of solid phthalic anhydride on the inside of vessel 15. A short scraper blade 35 with a support 53 is placed at the upper inner end of shaft 24 to remove any accumulation from head member 26 and bearing 25. The cylindrical outlet wall 14 and the lower surface of annular plate 13 do not normally require provision for scraping due to the high temperature of the incoming vapor stream entering the plenum chamber from conduit 10.

The method and means for introducing the incoming reacted hydrocarbon vapors, containing the vaporized phthalic anhydride, into the body of vessel 15, forms a particular feature of this invention, and will now be described. In plate 13, which forms the floor of plenum chamber 11, are a plurality of circumferentially spaced, downwardly directed gas inlets 60 leading into the confined zone formed by the cylindrical body 17 and bottom 18 of vessel 15, and each is provided with a central, coaxial, diverging water spray nozzle, generally designated 61, the tip of which is substantially flush with the inlet passage. Desirably, each water spray nozzle is made to be retractable and is enclosed throughout its length in a steam-jacketed tubular housing 62, as shown in detail in Figs. 7 and 8. The specific form and arrangement of this nozzle is described and claimed in the copending patent application of W. R. Postlewaite, et al, Serial No. 471,600, filed November 29, 1954 and entitled "Nozzle Assembly," assigned to the common assignee herewith.

Each housing 62 extends downwardly through the conical top 12 of vessel 15 and is supplied with steam or other heating fluid, which enters through inlet 63 while condensate is withdrawn through outlet 64, which communicates with the lower inner end of the jacket portion of housing 62. The upper end of the housing 62 above the steam jacket is provided with a gate valve 65, above which is a separable coupling 66 and an appropriate stuffing box 67. The water spray nozzle assembly 61 consists of an outer tubular member 68 extending downwardly to a threaded sleeve 69, into which a suitable divergent spraying and mixing nozzle tip 70 is secured. An inner conduit 71 extends from the top of member 68 through an appropriate stuffing box 72 to provide for expansion of the conduits, and also connects at its lower end to mixing nozzle 70. Water or other cooling liquid for the quenching operation is supplied to inner conduit 71 from any suitable source (not shown) and, in this example, air under suitable pressure to facilitate the fine subdivision of the water spray, is admitted through inlet 73 into the annulus between outer tubular member 68 and inner conduit 71, and enters nozzle 70 through passages 74.

An essential feature of the nozzle assembly is the provision that the heating jacket portion of housing 62 extends to the lower end of spray nozzle 61 to prevent accumulation of solid phthalic anhydride thereon. Desirably, the diverging air-water spray from nozzle tip 70 just grazes the lower end of jacket 62, as shown.

During such times as the removable spray nozzle assembly 61 is retracted from its position within its respective gas inlet 60, it may be desirable to close off that inlet, thereby preventing unbalance of the downwardly concurrently flowing stream of inlet vapors and water-quenching sprays. For such a mode of operation, a tubular valve rod housing 75 is provided extending downwardly through the conical top 12 of vessel 15 adjacent each of the housings 62 already described. A valve actuating rod 76 extends through a stuffing box 77 at the top of each housing 75 and is provided with a transverse plate 78 at its lower end, that plate extending sideways to join a sleeve 79 slidably mounted on the lower end of the adjacent jacketed tubular spray nozzle housing 62. A circular disc valve member 80 is supported on sleeve 79 and is movable, by means of rod 76, to close off the annulus in gas inlet 60 between the rim of that inlet and the spray nozzle housing 62. Desirably, but not necessarily, the housing 62 is provided with an outer guard conduit 81, extending downwardly into plenum chamber 11 from the flanges 82. The lower end 83 of guard conduit 81 thus acts to limit the upward travel of sleeve 79, carrying the disc valve member 80, when the gas passage 60 is to be opened.

At the upper end of tubular housing 62, and in this example supported by the shell of stuffing box 67, is a gauge stop member 84 on which a circular plate 85 secured to conduit 68 is adapted to rest, to limit the downward travel at 68 within its jacketed housing and thus accurately to position the nozzle tip 70 in the desired location. A lifting member 86 is secured to the upper end of conduit 68 with an appropriate hole 87 to receive any suitable hoisting means (not shown) to withdraw the inner tubular elements 68 and 69 and nozzle tip 70 to a point in jacketed housing 62 where valve 65 may be closed, thus permitting the detachable coupling 66 to be separated and the uppermost section of housing 62, together with the water spray nozzle assembly 61, to be entirely withdrawn for cleaning, inspection, or maintenance as may be required.

From the foregoing description of the quench vessel 15 and its associated parts and from Fig. 1, it will be understood that the incoming vapors from conduit 10 are distributed by plenum chamber 11 to the several downwardly directed gas passages 60 which direct the gas streams, together with the water sprays from nozzle assemblies 61 associated with the gas passages, downwardly along the cylindrical wall 17 of vessel 15 during which time the vapors are cooled and the introduced water is substantially entirely vaporized. The condensed solid phthalic anhydride tends to continue its travel downwardly to the outlet of the conical bottom 18 to be received in the solids conveyor element 20, which will be discussed in greater detail hereafter. The uncondensed gases combine and are reversed in direction to return upwardly near the center of the quench vessel 15, and pass into the central cylindrical body 15, carrying with them a small percentage of condensed phthalic anhydride in finely divided form. From body 15, these gases pass through a generally downwardly inclined rectangular outlet passage 88 provided with a heating fluid jacket 89 and insulation 90, and also fitted with a periodically actuated reciprocating scraper frame 91 actuated by a suitable motor 92. In this example, the motor 92 is a hydraulic cylinder having a piston 93, rod 94, and side bracket 95 connected to the side of scraper frame 91. Suitable driving fluid, such as steam or compressed air or hydraulic oil is supplied through conventional and appropriate valve means (not shown) to reciprocate the scraper frame within outlet passage 88.

Outlet passage 88 intersects tangentially the upper portion of a first cyclone, generally designated 96, consisting of an upper cylindrical shell portion 97, suitably jacketed at 98 for circulation of heating fluid, a conical bottom 99 terminating in a flanged connection 100 to a solids receiver and conveyor element 101. A motor 102 on top of the cyclone is suitably geared as at 103 to a slowly rotating central shaft 104 carrying scraper blades 105, 106, 107, and 108, which are effective to remove whatever small amount of fine phthalic anhydride that may accumulate on the inner surfaces of the cyclone 96. The usual insulation 109 and heating fluid coil 110 is provided to raise the shell temperature of the cyclone to the desired point to melt off any undesired accumulation of phthalic anhydride. As is customary in such structures, the inlet gases enter tangentially around a downwardly depending cylindrical sleeve 111 and move tangentially downwardly along the walls until the converging conical bottom 99 returns them up the center of the cyclone to pass into the open bottom of central outlet sleeve 111 and into a rectangular outlet passage 112 leading to a second cyclone 113. Here again, it is desirable to provide a reciprocating scraper 114 actuated by a motor, in this case an hydraulic cylinder 115 having a piston 117, rod 118, and a bracket 119 connecting the rod to the scraper frame.

The second cyclone 113 is essentially a replica of the first, except of somewhat smaller diameter, with a tangential inlet 112 to the upper cylindrical shell portion 120, jacketed at 121 for circulation of heating fluid, and having the usual conical bottom 122 terminating in a flanged connection 123 to a solids receiver and conveyor element 124. A motor 125 on the cyclone is suitably geared as at 126 to the slowly rotating central shaft 127 carrying scraper blades 128, 129, 130, and 131. Insulation 132 and a heating fluid coil 133 provide temperature control for the shell.

Desirably, but not necessarily, each scraper blade 105, 106, 107, 108 and 128, 129, 130 and 131 is formed from a half-round steel bar from the flat face of which is machined out a longitudinal V-shaped groove having a subtended angle of about 150°. One flat face of this groove is substantially parallel to the tangent of the inner face of the shell wall, and the other forms an angle of about 30° with that tangent. The line of intersection of the rounded face of the grooved bar with the edge of the groove is advanced against the deposit of phthalic anhydride, the recess behind the cutting edge acting to prevent the building up of a deposit behind that edge.

The outlet 134 from the central sleeve 128 of the second cyclone 113 may lead to a scrub tank or other disposal system, which is not material to this invention and, hence, is not shown or described herein.

The tree solids receiving and conveying elements 124, 100, and 20, in this example, are connected by conduit 135 to be a part of a jacketed and insulated system of conventional design, adapted to receive and to convey solid phthalic anhydride in one direction, without permitting passage or communication for vapors between the cyclones 96 and 113, and the quench vessel 15. One form that is usable for this purpose consists of a conduit having flexible and selectively contractible sections through which longitudinally spaced, tightly fitting flexible discs are pulled by means of a flexible cable, chain, or the like. This feature is not material to the present invention, and hence, is not shown or described in detail.

From the foregoing, it will be understood that this invention is in the general field of liquid spray cooling or direct quenching of vaporized materials, and specifically, solids such as phthalic anhydride from a reacted vapor stream containing that material. It comprehends broadly an improved method and means for insuring intimate contact between downwardly moving streams of vapors in a cylindrical vessel with the cooling liquid sprays, with provision for continuing the major number of those streams in uninterrupted operation and at the same time providing for removal of one or more spray nozzles assemblies. Other features include the improved heat-controlled scraping means for the quench vessel and the subsequent cyclone separators, together with their connecting passages, to obtain a sequential solids separating and collecting operation. These features have demonstrated their suitability for the several purposes outlined and described in detail herein.

Although only specific examples have been illustrated and described herein, it is understood that numerous changes and modifications could be made without departing from the essential features of the invention, so that all those that fall within the scope of the appended claims are intended to be covered thereby.

We claim:

1. A quench vessel having a substantially unobstructed vertical cylindrical portion, a cover for said vessel forming an annular plenum chamber enclosing a downwardly extending coaxial wall, a vapor inlet for said cover, a plurality of downwardly directed vapor passages connecting said plenum chamber with the cylindrical portion of said vessel, a vapor outlet extending through said coaxial wall and said cover, and means in said cover for supporting a liquid spray nozzle in each of said vapor passages.

2. A quench vessel according to claim 1 in which each of said liquid spray nozzles is provided with an enclosing heating jacket coextensive therewith.

3. A quench vessel according to claim 1 in which each of said liquid spray nozzles is retractable and is surrounded by a heating jacket throughout its length within said vessel.

4. A quench vessel according to claim 1 in which each of said spray nozzle support means comprises a valved conduit for selectively introducing and removing a nozzle therethrough without loss of fluid from said vessel.

5. A quench vessel according to claim 1 with the addition of a central shaft rotatably supported by said cover and extending downwardly therethrough into said vessel, and a plurality of scraping blades supported by said shaft.

6. A quench vessel according to claim 1 with the addition of a central shaft rotatably supported by said cover and extending downwardly therethrough into said vessel, and a plurality of scaper blades supported by said shaft, said shaft and blade support means being hollow for the circulation of a heating fluid therethrough.

7. A quench vessel having a substantially unobstructed vertical cylindrical portion, a cover for said vessel, means forming an annular plenum chamber beneath said cover, a vapor inlet for said plenum chamber, a plurality of downwardly directed vapor passages connecting said plenum chamber with the cylindrical portion of said vessel, and means for removably supporting a liquid spray nozzle in each of said passages.

8. A quench vessel according to claim 7 in which said nozzle support means comprise a heated jacket for said nozzle.

9. A quench vessel according to claim 7 in which said last-named means comprise a heated jacket for said nozzle and valve means surrounding said jacket and selectively movable to open and to close said vapor passage.

10. A quench vessel according to claim 7 in which said vapor passages are circumferentially spaced around said annular plenum chamber.

11. A method of separating a condensible solid material from a stream of vapors, comprising the steps of contacting said vapor stream with a cooling liquid spray directed downwardly into a confined zone, reversing the direction of said stream at the bottom of said zone and removing an uncondensed portion from the top thereof while continuing the downward travel of a portion of condensed solids, directing said vapor stream tangentially into an elongated vertical zone to cause condensed solids therein to adhere to the walls of said zone, removing uncondensed vapors from the center of said last-named zone, and scraping the walls of both of said zones to remove solids adhering thereto.

References Cited in the file of this patent

UNITED STATES PATENTS

| | | |
|---|---|---|
| 2,215,968 | Livingston | Sept. 24, 1940 |
| 2,446,181 | Kraus | Aug. 3, 1948 |
| 2,644,717 | Kopperschmidt | July 7, 1953 |
| 2,680,603 | Taylor | June 8, 1954 |
| 2,720,936 | Beu | Oct. 18, 1955 |